Aug. 1, 1939.  C. W. BRISTOL  2,167,872
RESILIENT LINKAGE FOR MEASURING INSTRUMENTS
Filed Oct. 1, 1937

INVENTOR.
CARLTON W. BRISTOL
BY
ATTORNEY.

Patented Aug. 1, 1939

2,167,872

UNITED STATES PATENT OFFICE 2,167,872

RESILIENT LINKAGE FOR MEASURING INSTRUMENTS

Carlton W. Bristol, Naugatuck, Conn., assignor to The Bristol Company, Waterbury, Conn., a corporation of Connecticut Application October 1, 1937, Serial No. 166,754

3 Claims. (Cl. 73—151)

This invention relates to measuring instruments, and more particularly to a resilient linkage adapted to eliminate objectionable oscillations in the indicating or recording of the mean positions of rapidly vibrating mechanical members.

In providing an indication or a record of the positions assumed by a mechanical member, such for example, as a processing roll, which measurement may afford valuable information as to the state of the material being processed by said roll, the condition frequently arises wherein such roll is subjected to rapid vibrations and jars whose magnitude has no significance in the measurement of the mean position.

It is the object of this invention to provide in the measuring mechanism of a mechanical motion instrument of this class a resilient linkage or spring coupling, whereby, without disturbing a positive and predetermined position relationship existing between the member whose movements are to be determined and the element which indicates or records the measurement, rapid vibrations of said member are prevented from reaching said element.

This is effected by associating a damping device directly with the index of a measuring mechanism, and connecting the said index with the forcibly moved and rapidly vibrating member through positive-motion means in which are included yielding means adapted to yield temporarily when movements of the said member are such as, when acting through the positive-motion means, would tend to move said index more rapidly than would be permitted by the said damping device.

The nature of the invention, however, will best be understood when described in connection with the accompanying drawing, in which.

Figure 1:
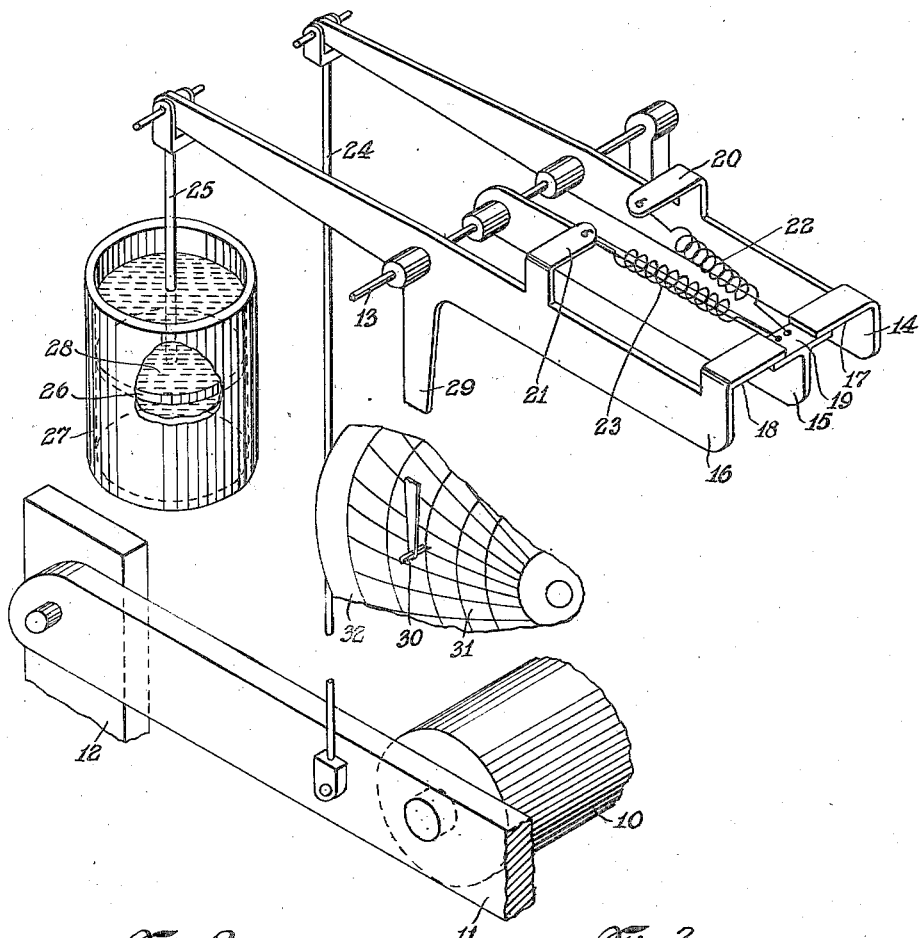
Fig. 1 is an isometric drawing of the invention as adapted to use in recording the positions of a processing roll.

Referring to the drawing, 10 designates a roll or the like, for instance a pulp-beater roll in a Jordan engine for processing wood pulp in the manufacture of paper, the position of which roll it is desired to record as an indication of the progress of the process and the quality of the product. The roll 10 is shown as journalled, at one end at least, in an end of a movable support or lighter bar 11, the said bar being pivotally supported at the other end by a fixed support 12 normally forming a part of the frame of the machine. The height of the roll is adjustable by manually- or power-actuated means, not shown in the drawing, and including the usual springs or other resilient elements whereby the position of the roll may conform to momentary changes in the material passing thereunder, without disturbing the predetermined adjustment.

Pivotally mounted on a common stationary shaft or spindle 13, and free for independent angular movement thereabout, are three arms 14, 15, and 16. Arms 14 and 16 have formed on their corresponding extremities inturned projections providing bearing surfaces 17 and 18, respectively; and arm 15 has formed on its extremity a bearing surface 19 adapted to be engaged by either or both surfaces 17 and 18 of the projections.

The said arms 14 and 16 carry further inturned projections 20 and 21, respectively, having therein perforations adapted to the attachment of tension springs 22 and 23, respectively, the remote extremities of these springs both being attached through suitable perforations to the extremity 19 of arm 15. There is thus formed a compact structure in which by the influence of the springs 22 and 23, the surfaces 17 and 18 are normally held in engagement with the surface 19 to afford a positive-motion means connecting the index to the lighter bar, but in which either pair of coacting surfaces may be separated by a force acting in opposition to, and overcoming, the influence of the corresponding spring.

A rearward extension of the arm 14 carries pivoted to its extremity a rod 24, providing mechanical connection to the lighter bar 11, to which the rod 24 also has pivoted connection. An extension of the arm 16 has pivoted to its extremity a vertical disposed rod 25 carrying on its lower end a piston 26 centrally located in a cylindrical vessel 27, containing oil or other viscous fluid 28, whereby is constituted a dashpot assembly providing a damping action on the movements of the arm 16.

Attached to the arm 16 intermediate its ends is an extended arm 29, provided at its extremity with a pointer 30, adapted to show on a calibrated scale 31 of a chart 32 a measure of the angular deflection of the arm 16 about the spindle 13. The pointer 30 may take the form of a recording pen or stylus, adapted to inscribe on the record chart 32, which may be of the conventional clock-driven class, a continuous record of the angular positions assumed by the arm 16 over an extended interval of time.

Under operating conditions, so long as movements imparted to the arm 14 from the lighter bar 11 are relatively gradual, the assembly constituted by the arms 14, 15, and 16 will be constrained by the influence of the springs 22 and 23, and will swing as a unit, the damping device not affording sufficient resistance to motion to overcome the tension of the springs; and the pen 30 will trace on the chart 32 a true graph of the positions assumed by the roll 10.

Figure 2:
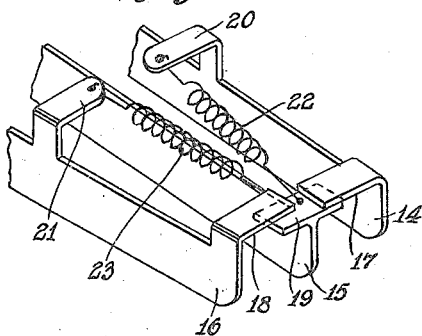
Figs. 2 and 3 illustrate to the same projection positions assumed by certain elements of the mechanism under different operating conditions.
Figure 3:
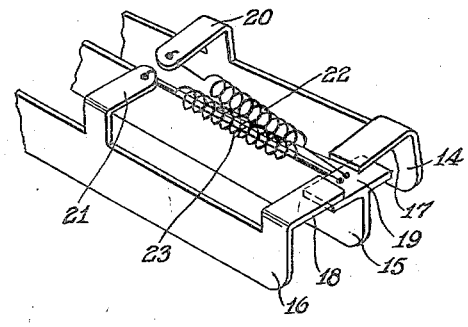

In the event of a sudden upward movement of the lighter bar 11, there will be a tendency for the arm assembly to be moved rapidly in a clockwise sense, whereupon the resistance of the liquid 28 contained in the vessel 27 to the passage of the piston 26 therethrough will develop a counterforce sufficient to overcome the normal tension of the spring 23, which will yield, allowing the surfaces 18 and 19 to be separated, as shown in Fig. 2. The arm 15 will thereby be carried away from the arm 16; and the pen 30 will move at a constant predetermined velocity and will take up on the chart scale a new position only as permitted by the movement of the piston 26 through the liquid 28. Similarly, upon a sudden drop of the bar 11, the assembly will tend to swing as a unit in a counterclockwise sense, whereupon the resistance of the damping device will restrain movement of the arms 15 and 16, which will not follow the deflection of the arm 14 until the same has ceased its rapid motion (see Fig. 3).

Thus, there has been provided means whereby, under conditions of slow movement, a positive linkage exists between the moving element and the indicating or recording pointer, and under conditions of rapid movement or oscillation a damping influence is temporarily introduced until the speed of movement of the parts whose positions are to be measured comes within predetermined limits as established by the strength of the tension springs and the viscosity of the fluid.

I claim:

1. In an instrument for measuring the deflections of a forcibly moved member: a scale, an index movable thereover, a damping device directly associated with said index, and motion-transmitting means comprising abutting means providing operative connection between said index and said member, together with yielding means normally maintaining said abutting means in operative engagement and adapted to yield temporarily when movements of said member in either direction are such as when acting through said abutting means would tend to move said index more swiftly than would be permitted by said damping device.

2. In an instrument for measuring the deflections of a forcibly moved member: a scale, an index movable thereover, a damping device directly associated with said index, and motion-transmitting means comprising abutting members providing operative connection between said index and said member and including at least three engaging parts, together with yielding means wholly carried by said abutting members and normally maintaining said parts in definite engagement, and adapted to yield and permit separation of two of said parts in accordance with movements of said member at a momentary velocity, imparted thereto by said member, higher than a value predetermined by the relative characteristics of said yielding means and said damping device.

3. An instrument for measuring the deflections of an oscillating mechanical part, comprising a scale and an index movable thereover, a spindle having mounted thereon three arms to rock in planes perpendicular to said spindle, a damping device, one of said arms being connected with said damping device and with said index, means connecting another of said arms to the mechanical part, the third arm having surfaces adapted to be engaged by corresponding surfaces of the other two arms, and resilient connections between said third arm and said other two arms whereby said engaging surfaces are normally maintained in contact.

CARLTON W. BRISTOL.